(12) United States Patent
Archer et al.

(10) Patent No.: US 9,706,360 B1
(45) Date of Patent: Jul. 11, 2017

(54) IDENTIFYING A POINT OF VIEW OF MEDIA CONTENT AND DISTRIBUTING THE MEDIA CONTENT BASED ON THE IDENTIFIED POINT OF VIEW

(71) Applicant: Verizon Patent and Licensing Inc., Arlington, VA (US)

(72) Inventors: Steven T. Archer, Dallas, TX (US); Matthew J. Threefoot, Columbia, MD (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 0 days.

(21) Appl. No.: 14/988,326

(22) Filed: Jan. 5, 2016

(51) Int. Cl.
*H04W 4/02* (2009.01)
*H04L 29/08* (2006.01)
*H04L 29/06* (2006.01)

(52) U.S. Cl.
CPC ......... *H04W 4/023* (2013.01); *H04L 65/4084* (2013.01); *H04L 65/80* (2013.01); *H04L 67/18* (2013.01)

(58) Field of Classification Search
CPC ..... G06T 17/05; G06T 15/06; G06T 2200/24; G06T 19/003; G06T 19/006; G06F 3/04815; G06F 3/14; G06F 3/165; G06F 17/30861; G06F 3/04883; G06F 3/017; G06F 3/04817; G06F 3/04842; H04L 67/06
USPC ............ 455/456.3; 345/633; 726/1; 707/758
See application file for complete search history.

(56) References Cited

U.S. PATENT DOCUMENTS

2014/0063057 A1*  3/2014  Eronen .............. H04N 5/23206
                                                345/633

* cited by examiner

*Primary Examiner* — Phuoc H Doan

(57) ABSTRACT

A method for processing media content is described. The method includes steps of receiving via a wireless network and at a content processing server media content of an activity captured by a mobile device; identifying a location of the mobile device and a location of the activity; and identifying a point of view characteristic of the received media content based on the location of the mobile device and the location of the activity. It is then determined whether the point of view characteristic of the received media content corresponds to a desired point of view of the activity. Upon determining the point of view characteristic of the received media content corresponds to the desired point of view, the content processing server selects to perform at least one of uploading and/or distributing of the media content via the content processing server to a user display device.

16 Claims, 9 Drawing Sheets

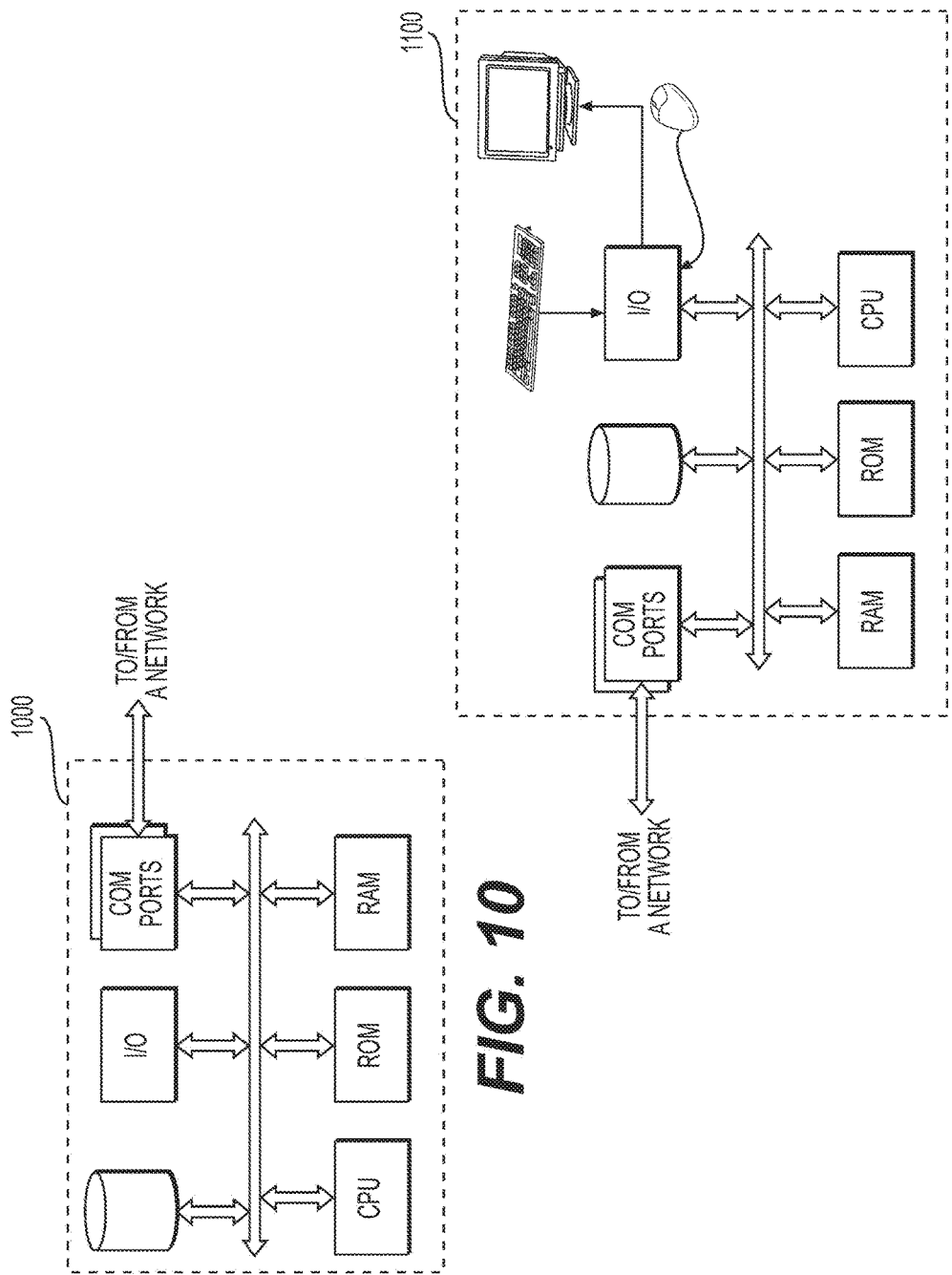

IDENTIFYING A POINT OF VIEW OF MEDIA CONTENT AND DISTRIBUTING THE MEDIA CONTENT BASED ON THE IDENTIFIED POINT OF VIEW

BACKGROUND

The existing methods of delivering a piece of digital content are limited in the options regarding a point-of-view (POV) visual location they provide at any specific event.

Hence a need exists for allowing a greater range of options for end users to be able to receive desired content over a communication network.

BRIEF DESCRIPTION OF THE DRAWINGS

The drawing figures depict one or more implementations in accordance with the present teachings, by way of example only, not by way of limitation. In the figures, like reference numerals refer to the same or similar elements.

FIG. 10 is a simplified functional block diagram of a computer that may be configured as a host or server, for example, to function as the servicer/server in the system of FIG. 1.

FIG. 11 is a simplified functional block diagram of a personal computer or other work station or terminal device.

DETAILED DESCRIPTION

Figure 1:
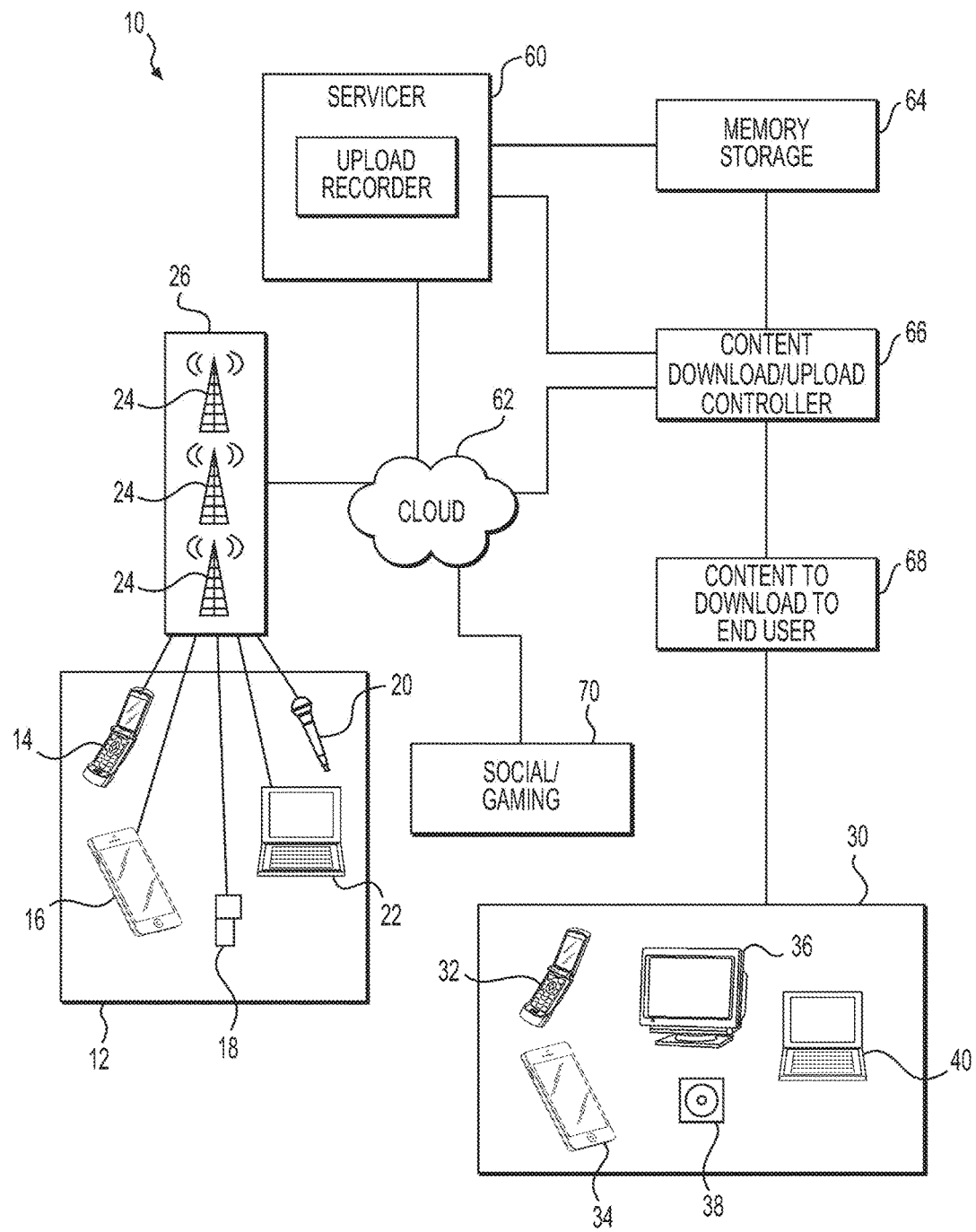
FIG. 1 is a high-level functional block diagram of an example of a content processing system providing a POV-based content processing service.

In the following detailed description, numerous specific details are set forth by way of examples in order to provide a thorough understanding of the relevant teachings. However, the present teachings may be practiced without such details. In other instances, well known methods, procedures, components, and/or circuitry have been described at a relatively high-level, without detail, in order to avoid unnecessarily obscuring aspects of the present teachings.

In one implementation, the instant application describes an ecosystem and a server client application platform that may allow one or more observers at a live event to create digital content and upload it to a servicing system, also referred to as a servicer. The servicing system may determine if the digital content is desirable, and provide the digital content to be displayed on an end user device. With the support from this system, observers may be able to upload digital content from their personal devices that may include still or video cameras, such as tablets, cell phones, active cameras, microphones, and portable handheld computers. The observers may actively or passively be recording or uploading content from their location or point or view (POV) relative to an event, such as, by way of examples only, a sports event, concert, or public event such as a demonstration or newsworthy situation. The observers may have registered their device with the servicer. The servicer may also receive specific location information about the observer device via any location monitoring system such as, by way of examples only, cellular location finding, GPS (Global Positioning System), RFID (radio frequency identification), WLAN (wireless local area network) and/or NFC (near field communication). This sequence of activities on an observer user device may happen without a user intervention because it leverages the user's device technology or other similar technology and may be enabled by the system. The servicer may receive multiple observer content streams and select one or more of the most desirable content streams. The servicer may then further distribute or send those streams to further components, which may include end user viewers. The ecosystem and platform may offer an intuitive and compelling user experience for observers to provide digital content from their respective POV's and for customers, or end users, to receive digital content with a desirable POV as selected by the servicer or the end user themselves. With the introduction of this new content receiving, managing, and providing system, the ecosystem may help observers be motivated to provide content to a servicer, and may help end users to experience content with a desirable POV.

Also by way of example, hyper-localization, sensors, and beacons may be used to determine the content provider's location, for example the user's device location. Moreover, the content provider's location can be matched with related location information, such as for example a location in a sports stadium or other entertainment venue, or a neighborhood of streets and buildings. One example may be which section or seating location in a venue the content provider user has. Another example may be a street address or location of the content provider user. Wi-Fi, GPS, beacons, triangulation may be used to accomplish hyper-location. Hyper-location may include altitude as well as geographic coordinates, in an XYZ coordinate system. Location information may be used to select or narrow down content provider feeds for further analysis. Also in the case of smart buildings, for example with beacons, a location associated with beacons in or near a building and its perspective may be used as a criteria. In some implementations, there may be an overlay of known location information about a building or geography, compared with the XYZ location (e.g., latitude, longitude, altitude) of the content provider device overlaid onto other pre-known building and geography information (which may be from an existing mapping system). Thus, in some implementations, a content provider device location (which may be hyper-localized) may be matched or compared with known information from another source. The known information may include building or venue structure information.

The features herein may include a local application with an opt-in for a content providing user to consent to location tracking for purposes of this system. User provided content may also be streamed, or recorded and tagged with a start and end time, e.g., a time stamp. Thus, information including location, time, etc, may be associated with the content. Also frames or still shots from a video media may be included in data associated with the content. This information can assist a software video-analytics system, or a potential viewer user, or an intermediary to select a most desired angle or POV. The intermediary may be a TV station or TV production network (producer), or a live or recorded video feed provider to consumers, or a local user such as a sports officiator, etc. Further, in some implementations, the location information, and in some cases the identity of the content upload user, etc., may be viewed via a social media application, so that friends, or other users can select content uploaded by specific individuals, or by location or other factors, such as desired angle of view. In some examples, the system or a user of the system may decide on a location and timeframe of an activity first. Then, the system or a user of the system may manually or automatically receive a best fit result, or a list of best fit results to choose from for forwarding or viewing. This analysis may be done via video-analytics software anywhere in the overall system and/or at the servicer aspect of the system. Further, video-analytic software, or a user, may look at a still frame and determine if the desired activity is in the frame and at desired angle or POV (e.g., was the camera or other mobile device pointed in the direction of, and/or did it capture, the activity of interest). This may be done by comparing features in a selected frame with other known video or known features. Thus, in some implementations, the system may process content taking into consideration information about content license rights, what registered participants are present at a desired location, recording during the time stamp, have valid video/frame content. Thus, in some implementations, the system may provide a single result for selection, or a unified view of multiple results to offer an optimized content.

A user interface (UI) may be provided at the content provider device. The overall system can process user rights, accessibility, quality and/or retrievability of the content, for example, via the UI. In one example, a media "producer" may inquire data from a data provider (which may be, for example, a cellular or other user device receiving/processing entity). The data provider may in turn inquire data from the subscribers of the data provider who have subscribed to the content providing services. The UI may have control features for a content providing user to activate streaming or recording, and/or in some implementations, the content providing user (also considered a registered participant, for example) may give a blanket permission, or a location or time-based permission such that the system may automatically select streaming or recording. In some implementations, the content providing user may receive an approval request for a specific one or many content selections, and may be asked to give approval for distribution of such. Further, the system may be used at a live event, or used to process now-recorded and stored content that is historical.

It may be desirable to pre-select content from content provider users before the actual content is uploaded to the overall system, in order to conserve system resources and/or bandwidth. Thus, in some implementations, the system may first only upload metadata, such as location and time stamp, and/or still frames, and use some of such or other data as a filter before uploading complete media content. Predictive analytics via software and related devices can be implemented in some examples, where it is known that certain metadata, which may be compared with known location data, corresponds with a desirable or non-desirable locations. For example, if a production company knows they lack cameras in a certain area, then content from content providing devices may be prioritized over content from content providing devices located where an existing camera is known to be already present.

In some implementations, the upload of metadata, or content, may be via a system that may charge a content providing user for data transfer. The system may have a feature so that the content providing user is not charged for some or all uploads, and may provide incentives, and/or financial and/or or other rewards for various participation, registration and/or upload activities. In a social media context, social media users with a relationship could be processed as being closed-loop or open-loop participants in their media uploads and viewing.

In some implementations, an intermediary, such as for example a production company, or an end user, may input a desired content, or desired characteristics of desired content, based on, for example, location, POV, other factors as mentioned herein, etc. The system may respond by gathering available user generated content, processing it in ways described herein and related factors, etc.

Herein, a description of one implementation may be made to three generalized groups. A first group may be associated with content provider users, also referred to as local observers, and their associated devices for recording or capturing content. Such users, may, by way of example only, be spectators or participants at an event such as a sporting event, concert, show, or any situation, such as for example, a newsworthy situation or their viewpoint in a video game or social network. A second group may be associated with end users, or remote viewers, and their associated devices for displaying and playing content. Between these groups, and including them in some implementations, is disclosed a system and method for managing, or servicing, the content so that content from a content provider user is delivered to an end user. This group may include various hardware, software, transmission and receiving methods, and in some implementations a servicer device with software that manages incoming content provider content, determines desirable incoming content, and delivers determined desirable content to end user remote viewers. In some instances or implementations, the content may be determined to be desirable based on its origin location, or POV relative to activities occurring in a geographic space or a virtual space.

Overall, and without limitation, the hardware, software and methods of some implementations will be referred to as a system. However, each group described herein will experience the system from their own perspective. For the sake of example only, one use of the foregoing technology may be in a sports venue with many spectators. Some spectators may be recording and/or live stream uploading audio/video content of the sports event, either on the field and/or off it, from a given current location, thus providing content having a POV relative to the activity they are recording and/or live stream uploading. Those local observers may wish to be content providing users and may desire to provide that content to other remote end user viewers. Some end user remote viewers, even if present at the overall site or not, may wish to view content from a different POV than their own. In some cases, such as television, or streaming media providers such as websites, an intermediary may be selecting content to be provided to end users, and those intermediaries may wish to select a POV to be provided to their end users. By way of a simplified example, in a stadium with many spectators each having video/audio capture devices, there may be other parties who wish to receive that captured media, and to select media from a given device that provides a desirable POV, such as, by way of example only, a close up view, or even a faraway view. An aspect of some implementations is that a crowd of spectators may participate in a crowd-sourced forum to provide content, and from their content may be selected certain content (by a manager/servicer, or by individual end users) via implementations of the methods and systems described herein.

By way of a merely specific example of some implementations, if a remarkable action or activity of interest occurs at a location, then the content providers who are close to the location, and thus have a POV close to the location, can provide close up views of that remarkable action of interest, and those views and associated content can be selected by the servicer or the end users, and displayed to end users who may desire to see that POV. The processes herein can be implemented in real-time, or can be implemented in delayed fashion via recording and playback.

Reference now is made in detail to the examples illustrated in the accompanying drawings and discussed below.

FIG. 1 is a high-level functional block diagram of an example of a content processing system 10 providing a POV-based content processing service. The system 10 communicates with multiple content provider devices (also referred to herein as mobile stations) 12, such as for example, any of a smartphone 14, a tablet 16, a camera such as an activity camera 18, an audio microphone 20, and/or a portable or stationary computer 22. The devices 12 are capable of capturing and sending content, such as video content, which may include still images, moving video images and/or audio content, all of which may in some cases include streaming content, and all of which are encompassed in this disclosure. The system 10 also communicates with multiple end user receiving and viewing devices 30, such as, for example, smartphones 32, a tablet 34, a television-type display 36, a speaker 38, and/or a personal computer 40, individually or in combination. The devices 30 are capable of receiving and displaying content, such as video content, which may include still images, moving video images and/or audio content, all of which may in some cases include streaming content, and all of which are encompassed in this disclosure.

The example also shows in simple depiction a mobile communication network 26, involving receiving and/or transmitting base stations 24. The devices 12 and network 26 are examples so that the network will provide similar communications for many other devices, including devices that are participating in the service, as well as for mobile devices/users that do not participate in the service. The network 26 provides mobile wireless communications services to those stations as well as to other mobile stations (not shown). The present techniques may be implemented in any of a variety of available mobile networks 26 and/or on any type of mobile station compatible with such a network, and the drawing shows only a very simplified example of a few relevant elements of the network for purposes of discussion here.

FIG. 1 thus also illustrates a system 10 offering a variety of mobile communication services, including communications for content processing by mobile station users. The example shows simply one mobile station 12 as well as a mobile communication network 26. The station 12 is further described below by examples 12a and 12b in FIGS. 8 and 9, and are examples of mobile stations that may be used for the content providing service. However, the network will provide similar communications for many other similar users as well as for mobile devices/users that do not participate in the content providing service. The network 26 provides mobile wireless communications services to those stations as well as to other mobile stations (not shown), for example, via a number of base stations 24. The present techniques may be implemented in any of a variety of available mobile networks 26 and/or on any type of mobile station compatible with such a network 26, and the drawing shows only a very simplified example of a few relevant elements of the network 26 for purposes of discussion here.

In this example, the system 10 functionally also includes a servicer computer or servicer 60, the internet cloud 62, a storage 64 such as a memory, a content download/upload controller device 66, a content download network 68, a social media or gaming software manager 70, and the plurality of end user devices 30, which may include visual, audio and or haptic display and/or other output capabilities. The servicer 60 may be provided by one or more computer servers, and/or may be distributed across various components of the system.

Figure 2:
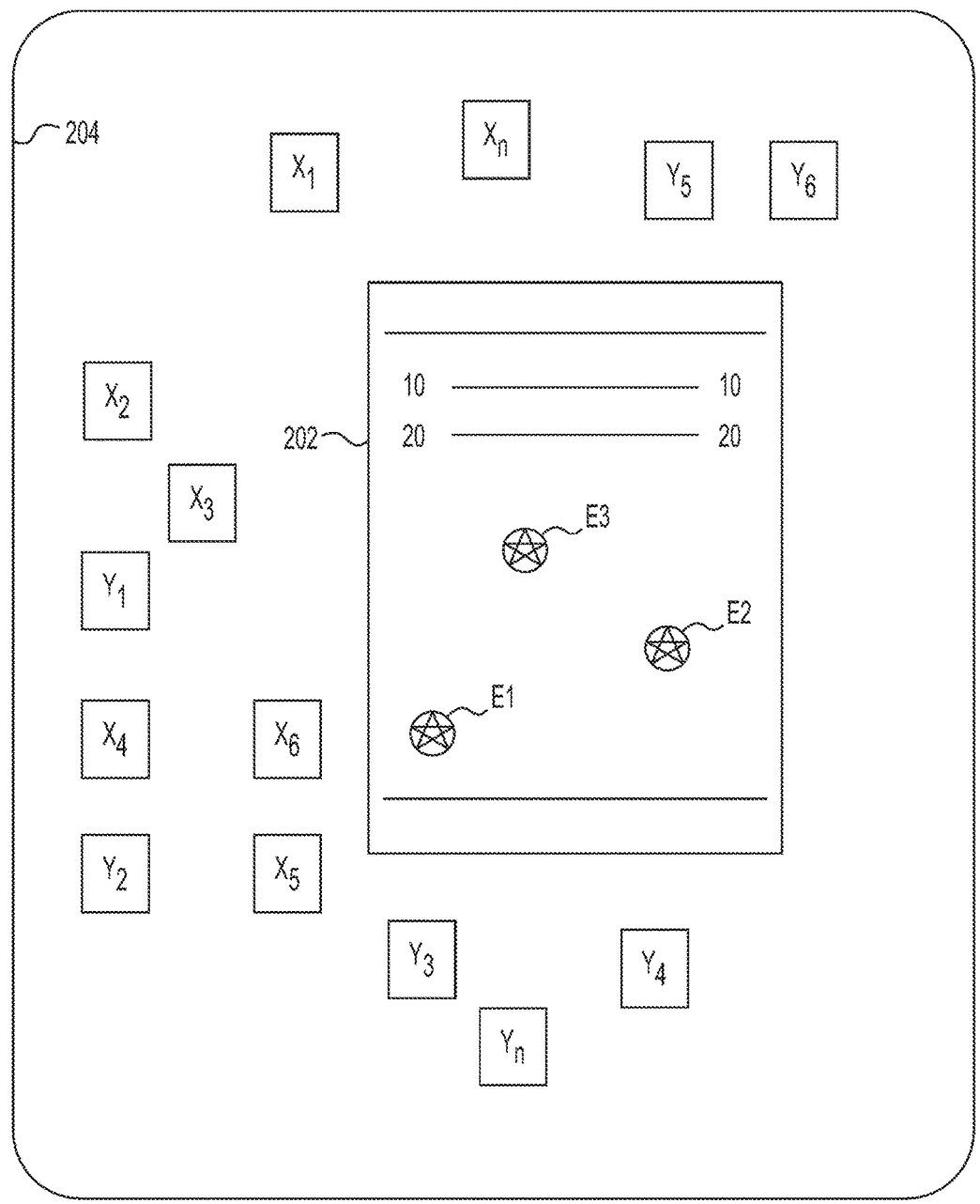
FIG. 2 is a high-level geographic depiction of an event with multiple user content providers.

FIG. 2 is a high-level geographic depiction of an event with multiple user content providers. In this example, a sporting situation/event in a stadium, such as for example only, a football game is occurring on a field of play 202, surrounded by a stadium 204. An interesting activity is occurring at location E1, such as a well-made play, or a penalty or celebration. Other possibly interesting activities are occurring at locations E2 and E3, such as a missed block. A number of observer users (X1 to X6) have different locations and thus different POV's relative to the activities E1, E2 and E3. Other observer users (Y1 to Y6) also have different locations and thus different POV's relative to activities E1, E2 and E3. These users (X1 to X6 and Y1 to Y6) may be considered as content providers, and have pre-registered with the servicer 60 so that they may record content such as pictures, video and/or audio of the game. There may be many more or less than six users registered, as represented by Xn and Yn. The servicer 60 also may know then-current location of each user, even as the users move around and change locations, using the location determining methods described herein or other location determining methods.

At any time, or continuously, the users may be capturing, recording and/or uploading content, either continuously or intermittently. For example, one user may be following and recording activity at location E1 from their POV, while another user is also following and recording activity location E1 from a different POV. Some users will have a more desirable POV than others. For example, in this illustration, user X6 is closest to the activity location E1 and thus may be selected as having the most desirable POV for having a close-up shot of that activity. Many criteria may be used to select one or more desired user POV's. For example, if the combination of activity locations E1, E2 and E3 was of interest, then user X2 may have a desirable POV that includes in one screen all three activities E1, E2 and E3 from a farther back perspective, if that is of interest.

A wide range of possible determining criteria can be implemented to determine whether a user has a desirable content to be shared. For example, in the case of a TV or streaming media broadcast, where only one POV is displayed to end users at a time, then the servicer 60 may select, from various users X1 to X6 and Xn, close up, side view, end view, unobstructed view, etc. The selection of most desirable users may be based on POV, and also may be filtered or sorted based on characteristics such as image density, image quality, or other factors. Users identified by X may be those who are actively providing content, and/or those who meet quality or other thresholds. The users Y1 to Y6 and Yn, may be users who are determined to be not desirable, such as being determined to currently have a low quality connection, low image quality, not having desired POA, or for other reasons, such as by not being registered to use the service.

In some implementations, users who provide content may be subscribing to a service that is dedicated to this event, or to a service that allows them to activate or deactivate their upload status. If the user is in an upload status, their content is provided to be available for download to the servicer 60, and eventually delivered to viewer end user devices 30. Permission for uploading and providing of the media may be implemented via the servicer 60, or by other devices.

The servicer 60 may perform a wide range of functions. For example, it may provide software for the content-providing users to register their devices, thus accepting license agreements to share their content. Also, end user viewer devices 30 may also interact with the servicer 60 or an intermediary such as content download manager 68, by which the end user viewers may subscribe to view the content on their local end user device 30. As described in other detail herein, the intermediary may be a TV network, web portal, etc. The servicer 60, the content download manager, or other devices may have information related to licenses of user rights as well as rights to content, and may provide notifications of charges or usages for license purposes to the appropriate users and/or intermediaries.

In some implementations, a viewer end user 30, or an intermediary, may be provided with a number of POV content simultaneously and may be able to select at their local device which POV content they wish to see, or replay.

Figure 3:
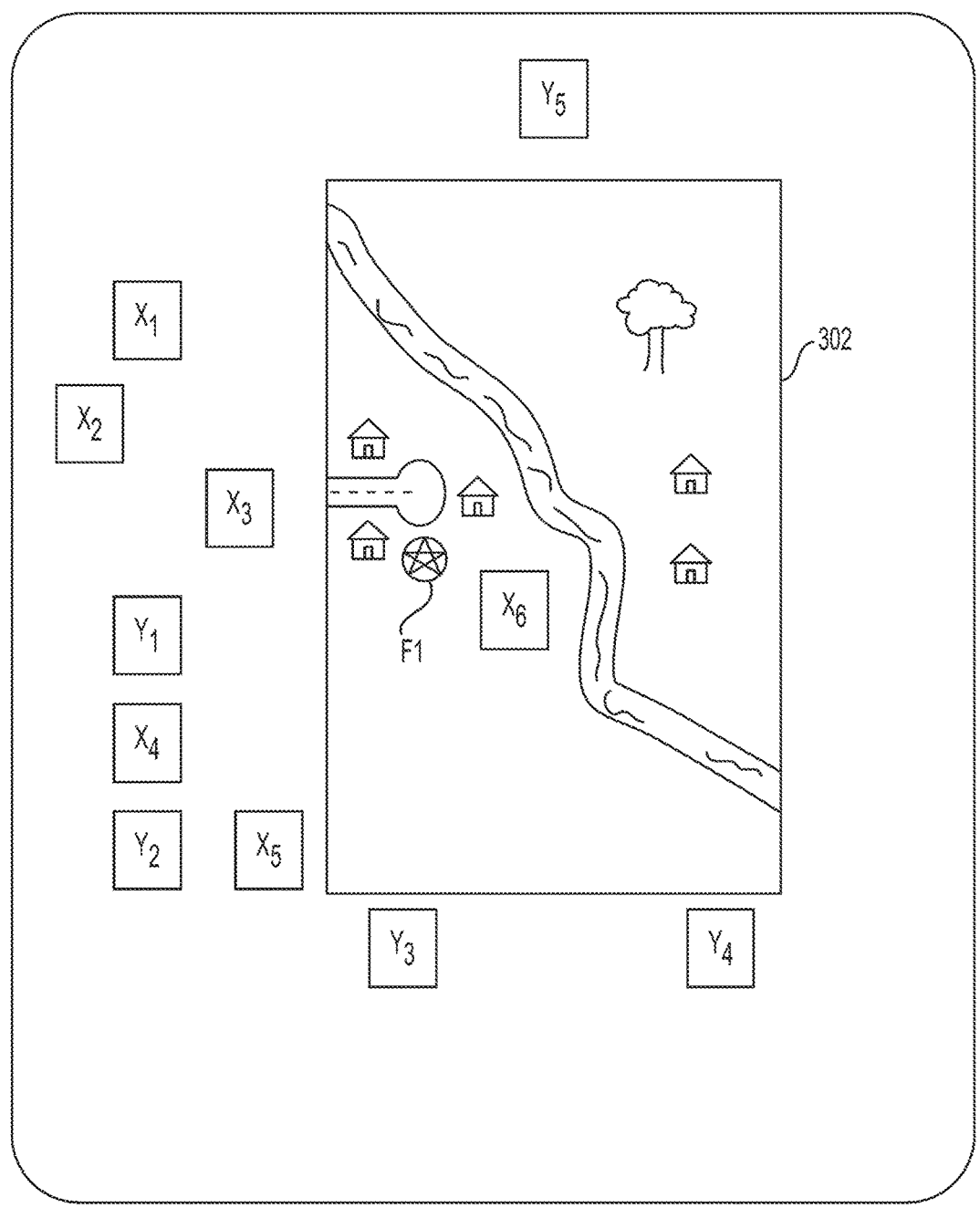
FIG. 3 is a high-level geographic depiction of an event with multiple user content providers.

FIG. 3 is another high-level geographic depiction of an event with multiple user content providers. In this example, a newsworthy situation is occurring in an area 302, having an activity F1. In this illustrated example, user content provider X6 has the closest view and may be selected by the servicer 60, intermediary and/or by users 30 as having the most desirable POV, which is then displayed on user devices 30.

The landscape, geographic arrangement, or any qualities of the areas 202 and 302 may be actual physical events. However, in some implementations, the areas 202 and 302 may be virtual reality such as, for example, in a video game environment. In such a case, the users X1 to Xn and Y1 to Yn may be providing static or streaming screen shots and audio of activities in a video game or other virtual environment, via any of the devices 30, which may further include a stationary computer. Also, social media content may be distributed or re-distributed using the systems and methods described herein, via the social media manager 70 or any software or hardware involved in the system. In that case, as in the other examples, any or all communication may be via wireless networks as described herein, and/or may be via the cloud or a non-wireless network.

Figure 4:
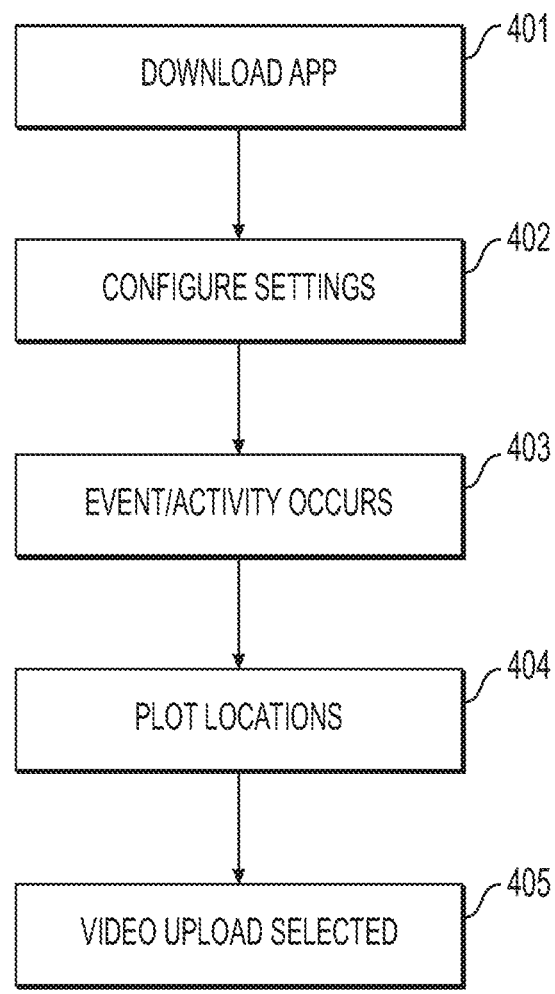
FIG. 4 is a simplified method diagram of a method for capturing event content and displaying event information, such as video/audio, to a recipient.

FIG. 4 is a simplified method diagram of a method for capturing event content and displaying event information, such as video/audio, to a recipient. At process 401, a content provider user downloads a software application and agrees to provide their device location and provides other consent such as a license for use of the video or other content recorded or streamed from their device. The local software application for the content provider may be delivered by interaction with the servicer 60. At process 402, the user configures settings for the software application such as, for example, a maximum amount of content to store locally or to transmit, other license terms such as duration of the license to use, and sending and receiving of tracking information such as what content was sent and whether content was selected and/or delivered to end users. At process 403, which may occur when or after an activity is occurring, the servicer 60 may survey all participating devices 12, including any content they may be providing. At process 404, the servicer may select content to upload further into the servicer devices based on various conditions, such as the identity of the content provider, the desirability of the content, the location of the content provider device 30, the POV of the content, and/or any other factors. At process 405, the servicer may distribute, deliver or make available the content to end users 30. Also at process 405, the servicer may reward the content provider 12 with a monetary, or symbolic or otherwise valuable reward and/or notification that their POV content was accepted, uploaded, distributed, and/or viewed by end users.

In some implementations, a content selected by the servicer 30 will be the sole content supplied at a time to end users 30. However, in other implementations, the end users 30 may be provided a selection of various POV contents to choose from.

Figure 5:
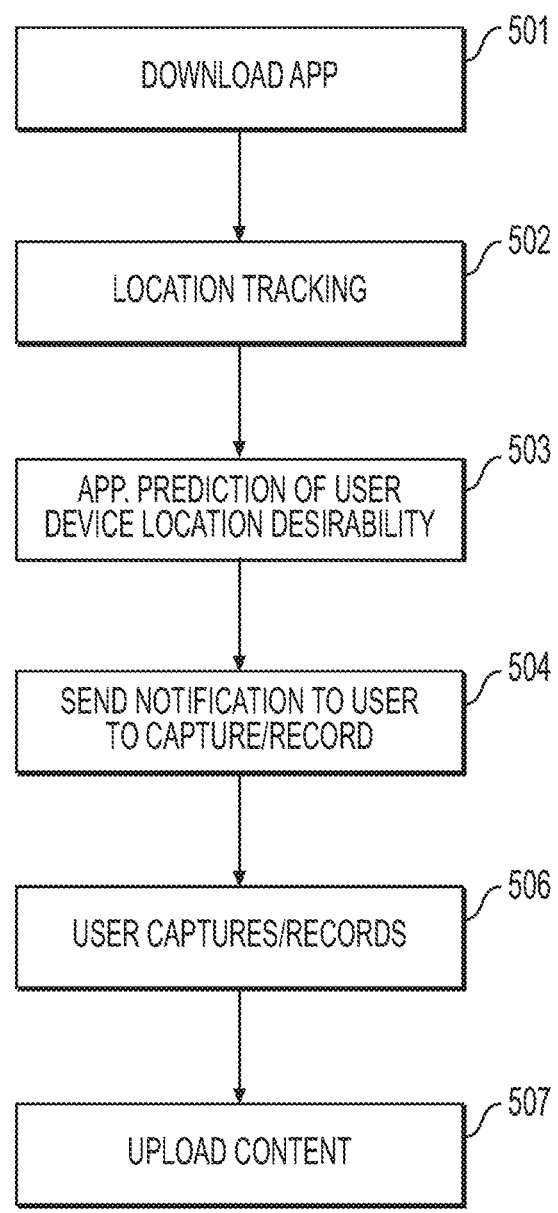
FIG. 5 is a simplified method diagram of a method for enabling management of media content.

FIG. 5 is a simplified method diagram of a method for enabling management of media content. At process 501, a content provider user downloads a software application and agrees to license terms as described above. At process 502, the system tracks the content provider user device's location. At process 503, the system predicts when the content provider user is in a desirable location for providing content. As described elsewhere herein, the servicer 60 in this implementation is aware of the present locations of at least some of the content provider user devices 12. The servicer 60 in some implementations may also be aware of the location(s) of activities of interest such as E1 and F1. Thus, using various predictive algorithms, at process 503 the servicer 60 can compare the locations of various user devices 12 with activities of interest and predict when a given user device 12 is likely to have a desirable POV or be in a desirable location, such as in close proximity to the activities of interest. In some implementations, the servicer 60 can then perform further processing with priority to the user devices in a desirable location. Further, the servicer 60 can provide a notification to the prioritized user devices that they should capture and/or record content at that time. When a user captures and/or records content via process 505, in response to the notification, or if they are already recording, the servicer 60 can initiate uploading, or in response to the notification the user can initiate uploading or make content available for uploading, so that the user provided content is uploaded at process 506. The content may be stored in storage 64 or directly sent to other components.

Figure 6:
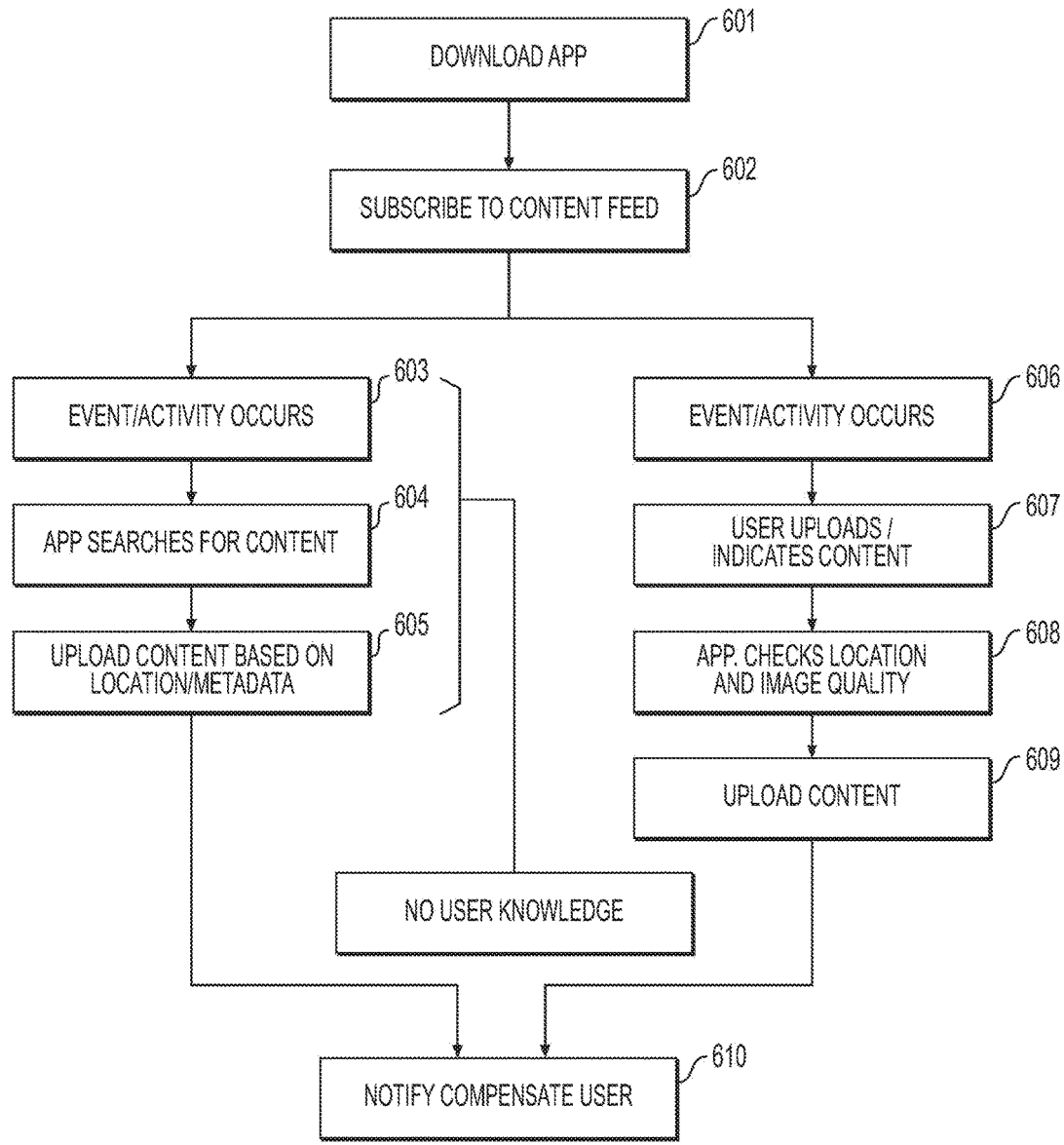
FIG. 6 is a simplified method diagram of a method for enabling management of media content and receiving of content by an end user.

FIG. 6 is another simplified method diagram of a method for enabling management of media content and receiving of content by an end user. At process 601, an end user downloads a software application that facilitates receipt of content. This end user may be a person having a personal device. This end user may also be a content intermediary, such as a TV network, a web portal, or any organization or persons or hardware and software that receive content, service the content, and provide content to further end users. At process 602, the end user subscribes to receive a content feed via the system 10, directly or via an intermediary. After process 602, at least two modes are possible. In a first mode, when an activity of interest occurs, at process 603, the software application will review the content provider user devices for content related to that time and a desirable location at process 604. If the content reviewed meets desirable factors, it is selected and then at process 605 the content is uploaded based on its location and other metadata. The first mode may be performed without any intervention or knowledge by the content providing user, other than the content providing user's subscription process. In a second mode, when an activity of interest occurs, at process 606, then at process 607 a user notifies the network that content has been or is being provided to the network. At process 608 the system checks the location and other factors of the image and determines if it is desirable. If the content reviewed meets desirable factors, it is selected and then at process 609 the content is uploaded based on its location and other metadata. In either mode, at process 610, the content providing user may receive from the system a monetary, or symbolic or otherwise valuable reward and/or notification that their POV content was accepted, uploaded, distributed, and/or viewed by end users.

Figure 7:
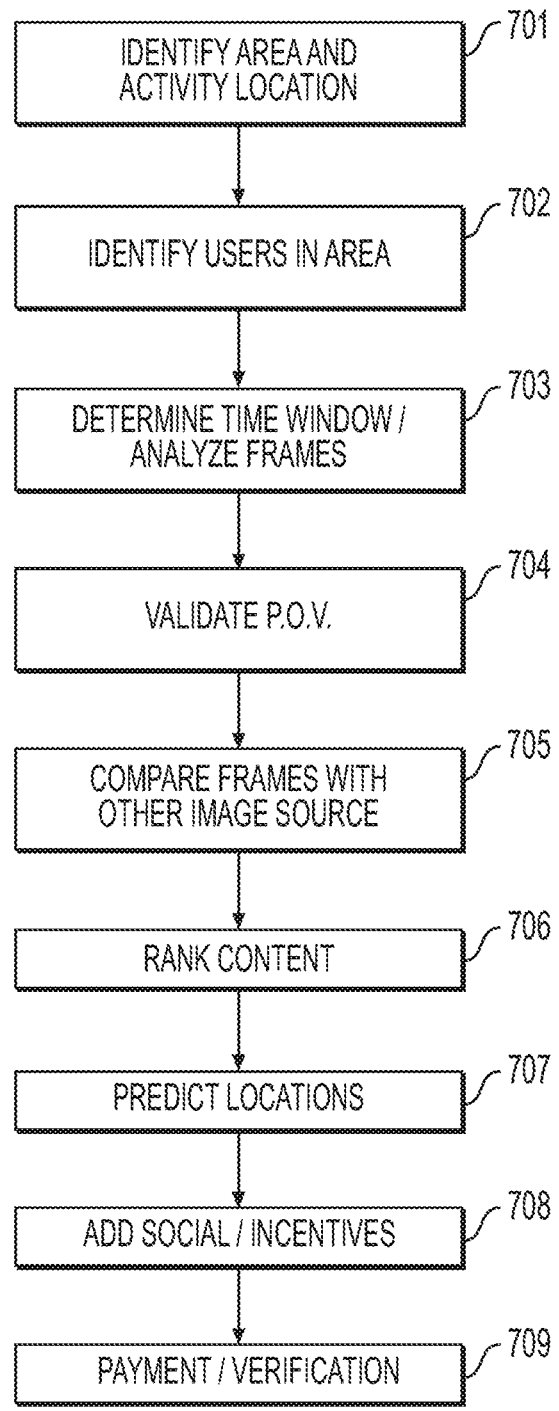
FIG. 7 is a simplified method diagram of a method for enabling management of media content and providing media to end users.

FIG. 7 is another simplified method diagram of a method for enabling management of media content and providing media to end users. As with other implementations herein, in some examples the method facilitates rapidly sorting through subscriber observer users and their captured or recorded content, at a location or venue to find content that is most desirable for further use. At process 701, an area of desired content, such as a sports venue or other building or geographic region is identified; an action or activity location within the area is identified, and one or more location coordinates having a desired POV are identified. At process 702, the subscriber observer users in the area are identified, including those who are presently capturing content. As in some other implementations, subscribers may have created their subscriptions using software from the location or venue, or from their wireless coverage provider, or from a website or other method. Process 702 may include polling the observer user devices to determine what user devices are capturing or recording content. Further at process 702, the system may take video frame samples and analyze them for clarity and other factors. At process 703, a time window of desired content may be determined based on general time, or an outside clock such as a TV network clock synchronizer. At process 704, frame samples may again be obtained from an observer device to validate the POV of the content. At process 705, the frame samples may be compared with another image source to validate the POV of the content. At process 706, a plurality of selected content from different devices may be ranked based on the respective device profile, image quality, POV, duration, and/or quality of sample frames. At process 707, a predictive algorithm may be used to predict other locations and POV's that may be desired in the future. At step 708, social aspects, sponsored data and other incentives can be incorporated for any or all users. At step 709, a payment or verification process may be implemented in order for end user viewers (or intermediaries such as TV networks, websites and/or magazines, for example) to receive the content.

While a servicer 60, a data/media/content storage (or memory) 64, and a content download/upload controller 66 are depicted in the implementation of FIG. 1, these functions and hardware may be centralized, combined or distributed via many types of processes and hardware. Any or all of these devices may be implemented on a single server, multiple servers or via other hardware and software arrangements.

Some implementations described herein relate to a live or real time system. However, some implementations may store, for example in the storage/memory 64, a wide amount of supplied POV content. In some instances, streaming or still images or audio may be desired by end users such as, for example, blogs, websites or publishing content providers, or TV shows later in time, etc. In examples of circumstances such as those, the servicer can be utilized in time after the event has concluded, and stored content may be searched and provided based on factors such as POV, time, image quality etc. In some circumstances, such as for example, a lengthy media clip, frames may be stored and analyzed for image quality, POV, timing and other factors.

Some implementations described herein include a wireless network. The wireless mobile communication network 26 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The network 26 is capable of data communications through the particular type of network (and the users thereof typically will have subscribed to data service through the network). The network 26 allows observer content provider devices 12 to also receive and execute applications written in various programming languages.

Observer content provider devices (mobile stations) 12 can take the form of various types of mobile stations, such as for example, portable handsets, smart-phones or personal digital assistants, although they may be implemented in other form factors. Program applications, including an application to assist in the recording and uploading service and/or any an application purchased via an on-line service can be configured to execute on many different types of devices 12. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The mobile communication network 26 can be implemented by a number of interconnected networks. Hence, the overall network 26 may include a number of radio access networks (RANs), as well as regional ground networks interconnecting a number of RANs and a wide area network (WAN) interconnecting the regional ground networks to core network elements. A regional portion of the network 26, such as that serving observer devices 12, can include one or more RANs and a regional circuit and/or packet switched network and associated signaling network facilities.

Physical elements of a RAN operated by one of the mobile service providers or carriers, include a number of base stations represented in the example by the base stations. Although not separately shown, such a base station can include a base transceiver system (BTS), which can communicate via an antennae system at the site of base station and over the airlink with one or more of the mobile stations, when the mobile stations are within range. Each base station can include a BTS coupled to several antennae mounted on a radio tower within a coverage area often referred to as a "cell." The BTS is the part of the radio network that sends and receives RF signals to/from the mobile stations that are served by the base station 17.

The radio access networks can also include a traffic network, and the internet, represented generally by the cloud at 62, which carries the user communications and data for the mobile stations between the base stations and other elements with or through which the mobile stations communicate. The network can also include other elements that support functionality other than device-to-device media transfer services such as messaging service messages and voice communications. Specific elements of the network for carrying the voice and data traffic and for controlling various aspects of the calls or sessions through the network are omitted here form simplicity. It will be understood that the various network elements can communicate with each other and other aspects of the mobile communications network 26 and other networks (e.g., the public switched telephone network (PSTN) and the Internet) either directly or indirectly.

The carrier will also operate a number of systems that provide ancillary functions in support of the communications services and/or application services provided through the network 26, and those elements communicate with other nodes or elements of the network 26 via one or more private IP type packet data networks (sometimes referred to as an Intranet), i.e., a private networks. Generally, such systems are part of or connected for communication via the private network. It is well known, however, would recognize that systems outside of the private network could serve the same functions as well. Examples of such systems, in this case operated by the network service provider as part of the overall network 26, which communicate through the intranet type network, include one or more application servers and a related authentication server for the application service of a primary servicer 60.

A mobile station 12 communicates over the air with a base station 24 and through a traffic network for various voice and data communications, e.g. through the Internet cloud 62 with a server and/or with application server 60. If the mobile service carrier offers the content processing service, the service may be hosted on a carrier operated application server, for communication via the network of devices. Alternatively, the content processing service may be provided by a separate entity (alone or through agreements with the carrier), in which case, the service may be hosted on an application server such as server 60 connected for communication via the networks. Server such as 60 may provide any of a variety of common application or service functions in support of or in addition to an application program running on the mobile station 12. However, for purposes of this application, we focused on functions thereof in support of the mobile content providing service. For a given service, including the content providing service, an application program within the mobile station may be considered as a 'client' and the programming at server 60 may be considered as the 'server' application for the particular service.

To insure that the application service offered by server 60 is available to only authorized devices/users, the provider of the application service may also deploy an authentication server. The authentication server could be a separate physical server, or authentication server could be implemented as another program module running on the same hardware platform as the server application 60. Essentially, when the server application (server 60 in our example) receives a service request from a client application on a mobile station 12, the server application provides appropriate information to the authentication server to allow the server application to authenticate the mobile station 12 as outlined herein. Upon successful authentication, the server 60 informs the server application, which in turn provides access to the service via data communication through the various communication elements of the network 10. A similar authentication function may be provided for the content processing service(s) offered via the server 60, either by the server 60 if there is an appropriate arrangement between the carrier and the operator of server 60, by a program on the server 60 or via a separate authentication server (not shown) connected to the Internet cloud 62.

The structure, programming and operations of the various type of mobile stations are well known. However, for completeness, it may be useful to consider the functional elements/aspects of two exemplary mobile stations 12, at a high-level.

Figure 8:
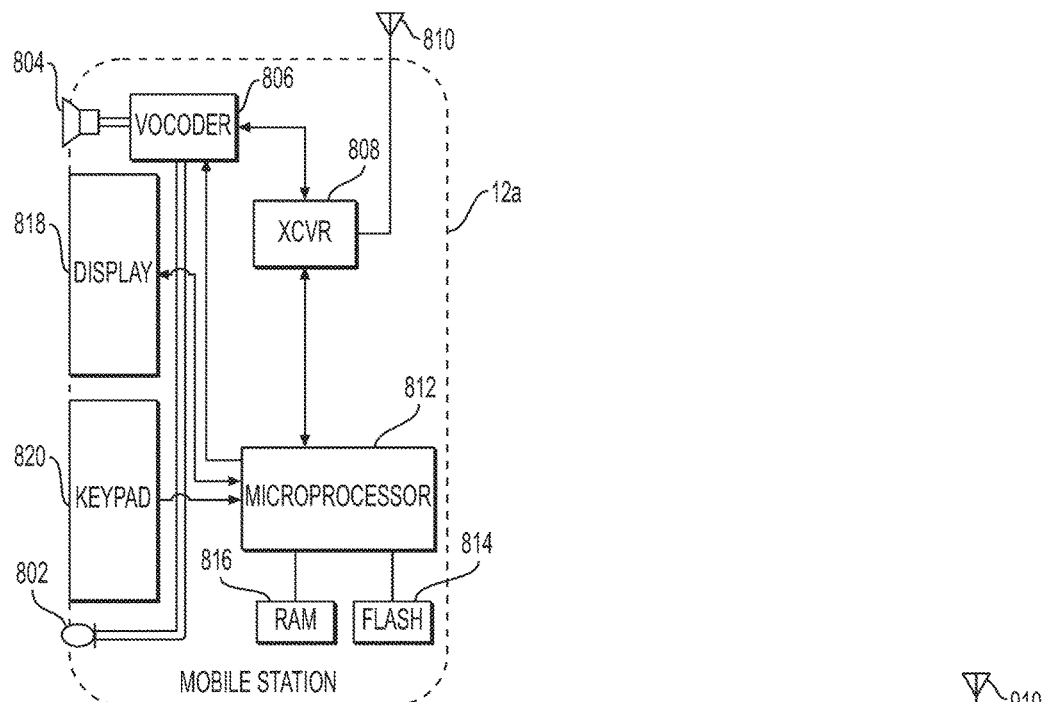
FIG. 8 is a high-level functional block diagram of an exemplary non-touch type mobile station as may utilize the content processing service through a network/system like that shown in FIG. 1.

For purposes of such a discussion, FIG. 8 provides a block diagram illustration of an exemplary non-touch type mobile station 12a. Although the mobile station 12a may be a smart-phone or may be incorporated into another device, such as a personal digital assistant (PDA) or the like, for discussion purposes, the illustration shows the mobile station 12a is in the form of a handset. The handset embodiment of the mobile station 12a functions as a normal digital wireless telephone station. For that function, the station 12a includes a microphone 802 for audio signal input and a speaker 104 for audio signal output. The microphone 802 and speaker 804 connect to voice coding and decoding circuitry (vocoder) 806. For a voice telephone call, for example, the vocoder 806 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 12a also includes at least one digital transceiver (XCVR) 808. Today, the handset 12a would be configured for digital wireless communications using one or more of the common network technology types. The concepts discussed here encompass embodiments of the mobile station 12a utilizing any digital transceivers that conform to current or future developed digital wireless communication standards. The mobile station 12a may also be capable of analog operation via a legacy network technology.

The transceiver 808 provides two-way wireless communication of information, such as vocoded speech samples and/or digital information, in accordance with the technology of the network 15. The transceiver 808 also sends and receives a variety of signaling messages in support of the various voice and data services provided via the mobile station 12a and the communication network. Each transceiver 808 connects through RF send and receive amplifiers (not separately shown) to an antenna 810. The transceiver may also support various types of mobile messaging services, such as short message service (SMS), enhanced messaging service (EMS) and/or multimedia messaging service (MMS).

The mobile station 12a includes a display 818 for displaying messages, menus or the like, call related information dialed by the user, calling party numbers, etc., including other aspects of the content processing service. A keypad 820 enables dialing digits for voice and/or data calls as well as generating selection inputs, for example, as may be keyed-in by the user based on a displayed menu or as a cursor control and selection of a highlighted item on a displayed screen. The display 818 and keypad 820 are the physical elements providing a textual or graphical user interface. Various combinations of the keypad 820, display 818, microphone 802 and speaker 804 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed during utilization of the content processing service.

A microprocessor 812 serves as a programmable controller for the mobile station 12a, in that it controls all operations of the mobile station 12a in accord with programming that it executes, for all normal operations, and for operations involved in the content processing procedure under consideration here. In the example, the mobile station 12a includes flash type program memory 814, for storage of various "software" or "firmware" program routines and mobile configuration settings, such as mobile directory number (MDN) and/or mobile identification number (MIN), etc. The mobile station 12a may also include a non-volatile random access memory (RAM) 816 for a working data processing memory. Of course, other storage devices or configurations may be added to or substituted for those in the example. In a present implementation, the flash type program memory 814 stores firmware such as a boot routine, device driver software, an operating system, call processing software and vocoder control software, and any of a wide variety of other applications, such as client browser software and short message service software. The memories 814, 816 also store various data, such as telephone numbers and server addresses, downloaded data such as multimedia content, and various data input by the user. Programming stored in the flash type program memory 814, sometimes referred to as "firmware," is loaded into and executed by the microprocessor 812.

As outlined above, the mobile station 12a includes a processor, and programming stored in the flash memory 814 configures the processor so that the mobile station is capable of performing various desired functions, including in this case the functions involved in the technique for providing aspects of the content processing service.

Figure 9:
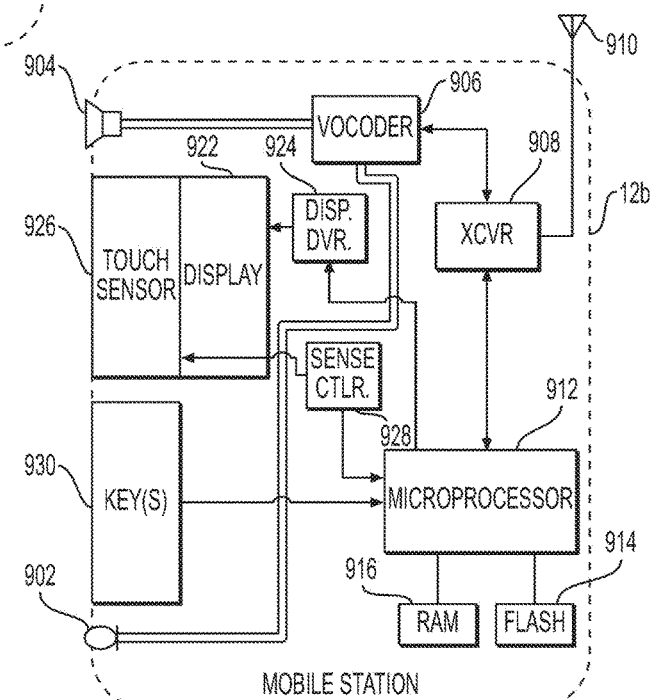
FIG. 9 is a high-level functional block diagram of an exemplary touch screen type mobile station as may utilize the content processing service through a network/system like that shown in FIG. 1.

For purposes of such a discussion, FIG. 9 provides a block diagram illustration of an exemplary touch screen type mobile station 12b. Although possibly configured somewhat differently, at least logically, a number of the elements of the exemplary touch screen type mobile station 12b are similar to the elements of mobile station 12a, and are identified by like reference numbers in FIG. 3. For example, the touch screen type mobile station 12b includes a microphone 902, speaker 904 and vocoder 906, for audio input and output functions, much like in the earlier example. The mobile station 12b also includes at least one digital transceiver (XCVR) 908, for digital wireless communications, although the handset 12b may include an additional digital or analog transceiver. The concepts discussed here encompass embodiments of the mobile station 12b utilizing any digital transceivers that conform to current or future developed digital wireless communication standards. As in the station 12a, the transceiver 908 provides two-way wireless communication of information, such as vocoded speech samples and/or digital information, in accordance with the technology of the network 15. The transceiver 908 also sends and receives a variety of signaling messages in support of the various voice and data services provided via the mobile station 12b and the communication network. Each transceiver 908 connects through RF send and receive amplifiers (not separately shown) to an antenna 910. The transceiver may also support various types of mobile messaging services, such as short message service (SMS), enhanced messaging service (EMS) and/or multimedia messaging service (MMS).

As in the example of station 12a, a microprocessor 912 serves as a programmable controller for the mobile station 12b, in that it controls all operations of the mobile station 12b in accord with programming that it executes, for all normal operations, and for operations involved in the content processing procedure under consideration here. In the example, the mobile station 12b includes flash type program memory 914, for storage of various program routines and mobile configuration settings. The mobile station 12b may also include a non-volatile random access memory (RAM) 916 for a working data processing memory. Of course, other storage devices or configurations may be added to or substituted for those in the example. Hence, outlined above, the mobile station 12b includes a processor, and programming stored in the flash memory 914 configures the processor so that the mobile station is capable of performing various desired functions, including in this case the functions involved in the technique for providing content processing.

In the example of FIG. 8, the user interface elements included a display and a keypad. The mobile station 12b may have a limited number of keys 930, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile station 12b includes a display 922, which the microprocessor 912 controls via a display driver 924, to present visible outputs to the device user. The mobile station 12b also includes a touch/position sensor 926. The sensor 926 is relatively transparent, so that the user may view the information presented on the display 922. A sense circuit 928 sensing signals from elements of the touch/position sensor 926 and detects occurrence and position of each touch of the screen formed by the display 922 and sensor 926. The sense circuit 928 provide touch position information to the microprocessor 912, which can correlate that information to the information currently displayed via the display 922, to determine the nature of user input via the screen.

The display 922 and touch sensor 926 (and possibly one or more keys 930, if included) are the physical elements providing the textual and graphical user interface for the mobile station 12b. The microphone 902 and speaker 904 may be used as additional user interface elements, for audio input and output, including with respect to some content processing related functions.

The structure and operation of the mobile stations 12a and 12b, as outlined above, are described to by way of example, only.

As shown by the above discussion, functions relating to the an enhanced user experience for the content processing service, via a graphical user interface of a mobile station may be implemented on computers connected for data communication via the components of a packet data network, operating as a content provider (mobile station) device and/or as a user viewing device as shown in FIG. 1. Although special purpose devices may be used, such devices also may be implemented using one or more hardware platforms intended to represent a general class of data processing device commonly used to run "server" programming so as to implement the content processing functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the recording content, providing the content to the content processing server, receiving the content at the content processing service, processing the content based on the point of view associated with the content, and providing the content to a user display device. The software code is executable by the general-purpose computer that functions as the servicer server and/or that functions as a content provider or end user terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for receiving, servicing, and providing content in essentially the manner performed in the implementations discussed and illustrated herein.

FIGS. 10 and 11 provide functional block diagram illustrations of general purpose computer hardware platforms. FIG. 10 illustrates a network or host computer platform 1000, as may typically be used to implement a server. FIG. 11 depicts a computer 1100 with user interface elements, as may be used to implement a personal computer or other type of work station or terminal device, although the computer of FIG. 11 may also act as a server if appropriately programmed. The structure, programming and general operation of such computer equipment are well known and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature and well known. Of course, the server functions may be implemented in a distributed fashion on a number of similar platforms, to distribute the processing load.

Hence, aspects of the methods of receiving, servicing and providing POV content outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of the content provider and/or end user server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the content receiving, servicing and providing functions, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

In one general aspect, a method for processing media content is provided. The method includes receiving over an electronic network communication system information related to at least one media content captured from a first media capture device; determining information that identifies an activity location and a point of view characteristic of the received media content relative to the activity location; and selecting, based on the determined point of view, whether to perform at least one of uploading and/or distributing of the media content via the network communication system to a user display device.

The above general aspect may include one or more of the following features. The point of view may be determined based on comparison of a location of the first media capture device with the activity location. The selecting may be performed based on the distance between the location of the first media capture device and the activity location. The selecting may be performed at a servicer device, and the first media capture device may be configured to capture the at least one media content and send the at least one media content to the servicer device. The first media capture device may be one of a plurality of first media capture devices. The selecting further may include determining at least one of a subscription status, a permission status, and/or a registration status of the first device. The selecting may further include evaluating a characteristic of the media content. The characteristic of the media content may include at least one of a feature in a frame of the media content, an image quality of the media content, and/or a user identity related to the first device. The first media capture device may be configured to perform at least one of capturing and/or recording of the media based on a live event.

The method may further include notifying, if uploading and/or distribution is performed, the first media capture device that uploading and/or distribution has been performed. The method may further include receiving a plurality of media content, respectively, from a plurality of first media capture devices; determining a point of view of each respective one of the media contents relative to an activity location; and selecting, based on the determined point of view, whether to perform at least one of uploading and/or distributing of each respective one of the media content to the user display device.

These general and specific aspects may be implemented using a system, a method, or a computer program, or any combination of systems, methods, and computer programs.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A method for processing media content, the method comprising: receiving via a wireless network and at a content processing server media content of an activity captured by a mobile device; identifying a location of the mobile device and a location of the activity; identifying a point of view characteristic of the received media content based on the location of the mobile device and the location of the activity; determining whether the point of view characteristic of the received media content corresponds to a desired point of view of the activity; and upon determining the point of view characteristic of the received media content corresponds to the desired point of view, selecting at the content processing server to perform at least one of uploading and/or distributing of the media content via the content processing server to a user display device; wherein determining that the point of view characteristic of the received media content corresponds to the desired point of view includes determining a distance between the location of the mobile device and the location of the activity is less than a threshold distance and includes determining that the point of view characteristic of the received media content includes a footage of the activity associated with a specific time and angle.

2. The method of claim 1, wherein identifying the point of view characteristic of the received media content, includes identifying the point of view characteristic of the received media content based on comparison of the location of the mobile device with the location of the activity.

3. The method of claim 1, wherein the mobile device is one of a plurality of first mobile devices and a user display device is one of a plurality of second mobile devices.

4. The method of claim 1, further comprising determining at least one of a subscription status, a permission status, and/or a registration status of the mobile device prior to selection to perform at least one of uploading and/or distributing of the media content via the content processing server to the user display device.

5. The method of claim 1, further comprising evaluating a characteristic of the media content prior to selecting to perform at least one of uploading and/or distributing of the media content via the content processing server to the user display device.

6. The method of claim 5, wherein the characteristic of the media content includes at least one of a feature in a frame of the media content, an image quality of the media content, and/or a user identity related to the mobile device.

7. The method of claim 1, wherein the activity corresponds to a live event.

8. The method of claim 1, further comprising:
uploading and/or distributing the media content to the user display device; and
notifying the mobile device of the uploading and/or distributing of the media content.

9. The method of claim 1, wherein:
receiving the media content of the activity includes receiving media content of the activity from a plurality of the mobile devices;
identifying the location of the mobile device includes identifying a location of each of the plurality of the mobile devices;
identifying the point of view characteristic of the received media content includes identifying a plurality of point of view characteristics of the received media content based on the location of each of the plurality of mobile devices and the location of the activity;
determining whether the point of view characteristic of the received media content corresponds to the desired point of view of the activity includes determining whether each of the plurality of point of view characteristics correspond to the desired point of view; and
selecting to perform at least one of uploading and/or distributing of the media content includes selecting to perform at least one of the uploading and/or distributing of the media content for each of the plurality of point of view characteristics corresponding to the desired point of view.

10. A content processing server comprising: a processor; and a non-transitory computer readable storage medium including a plurality of instructions which, when executed by the processor, cause the processor to: receive via a wireless network media content of an activity captured by a mobile device; identify a location of the mobile device and a location of the activity; identify a point of view characteristic of the received media content based on the location of the mobile device and the location of the activity; determine whether the point of view characteristic of the received media content corresponds to a desired point of view of the activity; and upon determining the point of view characteristic of the received media content corresponds to the desired point of view, select to perform at least one of uploading and/or distributing of the media content via the content processing server to a user display device; wherein to determine that the point of view characteristic of the received media content corresponds to the desired point of view, the non-transitory computer readable storage medium further includes instructions which, when executed by the processor, cause the processor to determine that a distance between the location of the mobile device and the location of the activity is less than a threshold distance and to determine that the point of view characteristic of the received media content includes a footage of the activity associated with a specific time and angle.

11. The content processing server of claim 10, wherein to identify the point of view, the non-transitory computer readable storage medium further includes instructions which, when executed by the processor, cause the processor to identify the point of view characteristic of the received media content, based on comparison of the location of the mobile device with the location of the activity.

12. The content processing server of claim 10, wherein mobile device is one of a plurality of first mobile devices and a user display device is one of a plurality of second mobile devices.

13. The content processing server of claim 10, wherein the non-transitory computer readable storage medium further includes instructions which, when executed by the processor, cause the processor to determine at least one of a subscription status, a permission status, and/or a registration status of the mobile device prior to selecting to perform at least one of uploading and/or distributing of the media content via the content processing server to the user display device.

14. The content processing server of claim 10, wherein the non-transitory computer readable storage medium further includes instructions which, when executed by the processor, cause the processor to evaluate a characteristic of the media content prior to selecting to perform at least one of uploading and/or distributing of the media content via the content processing server to the user display device.

15. The content processing server of claim 14, wherein the characteristic of the media content includes at least one of a feature in a frame of the media content, an image quality of the media content, and/or a user identity related to the mobile device.

16. The content processing server of claim 10, wherein the non-transitory computer readable storage medium further includes instructions which, when executed by the processor, cause the processor to:
upload and/or distribute the media content, to the user display device; and
notify the mobile device of the uploading and/or distributing of the media content.

* * * * *